Oct. 6, 1936.          J. D. FERRY                2,056,845
         FOOD HANDLING AND PREPARING APPARATUS
                Filed April 27, 1934        4 Sheets-Sheet 3
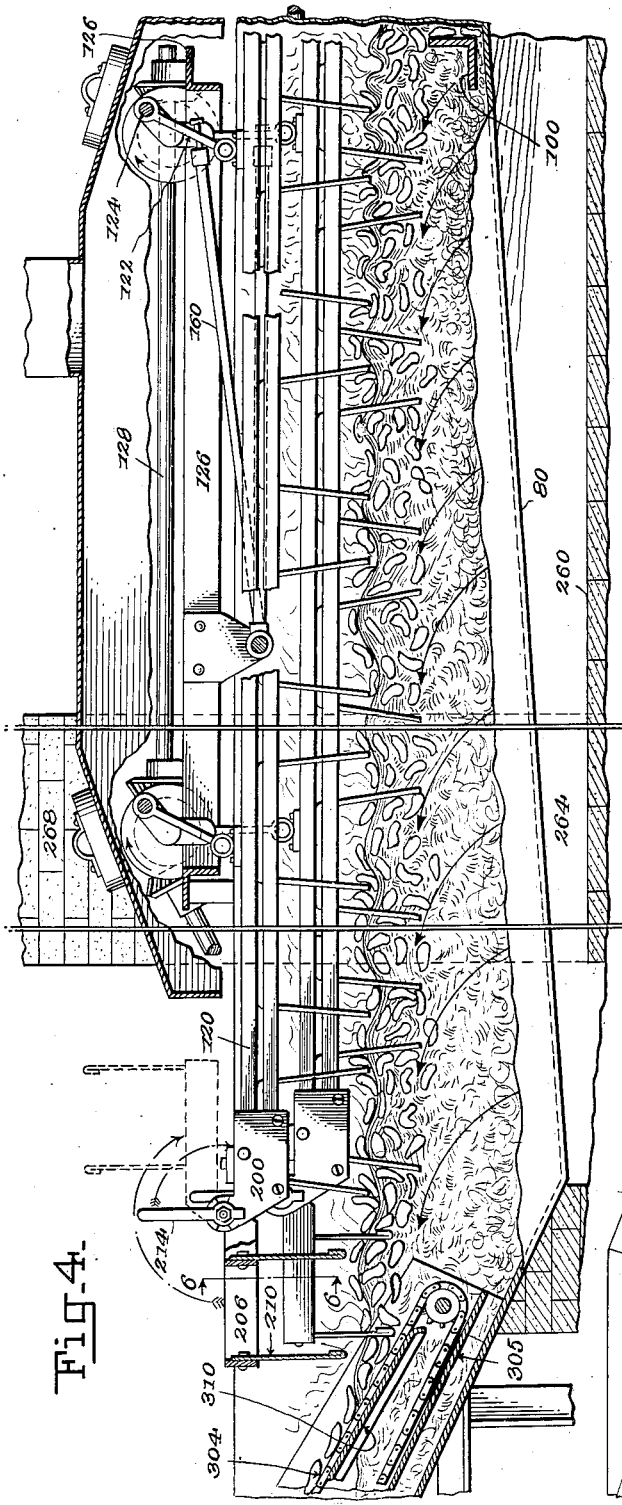
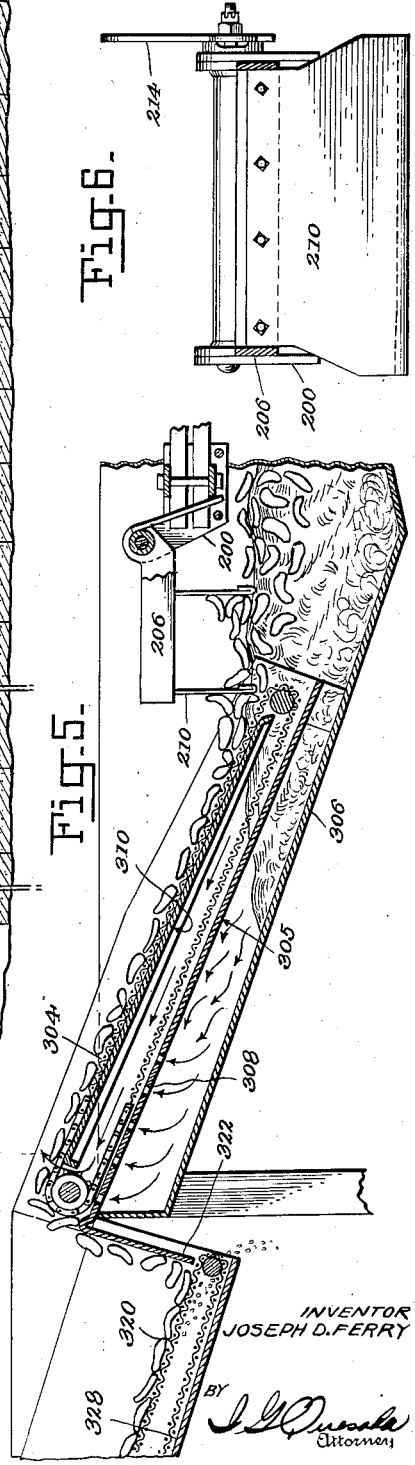
INVENTOR
JOSEPH D. FERRY Oct. 6, 1936.  J. D. FERRY  2,056,845
FOOD HANDLING AND PREPARING APPARATUS
Filed April 27, 1934  4 Sheets-Sheet 4
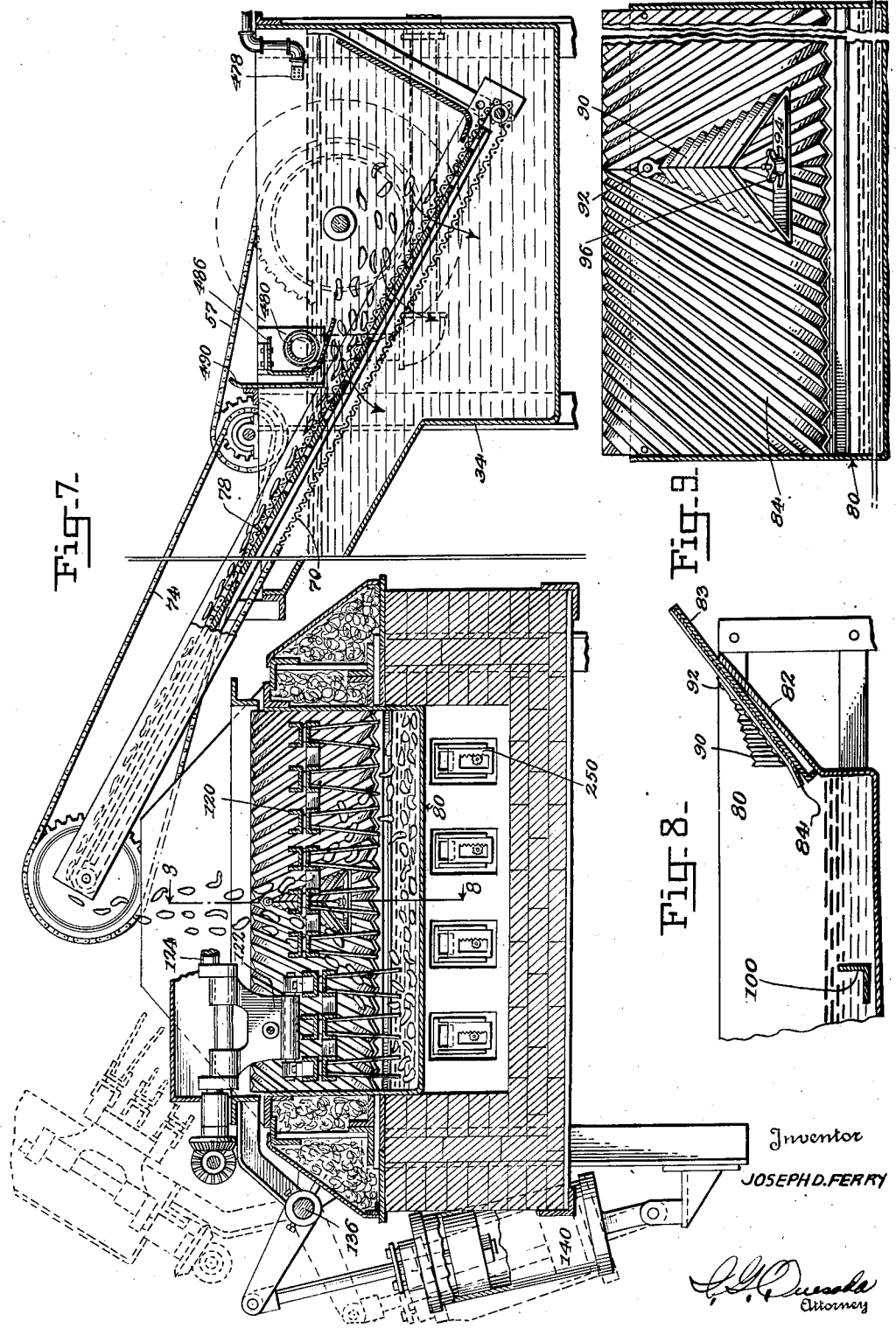

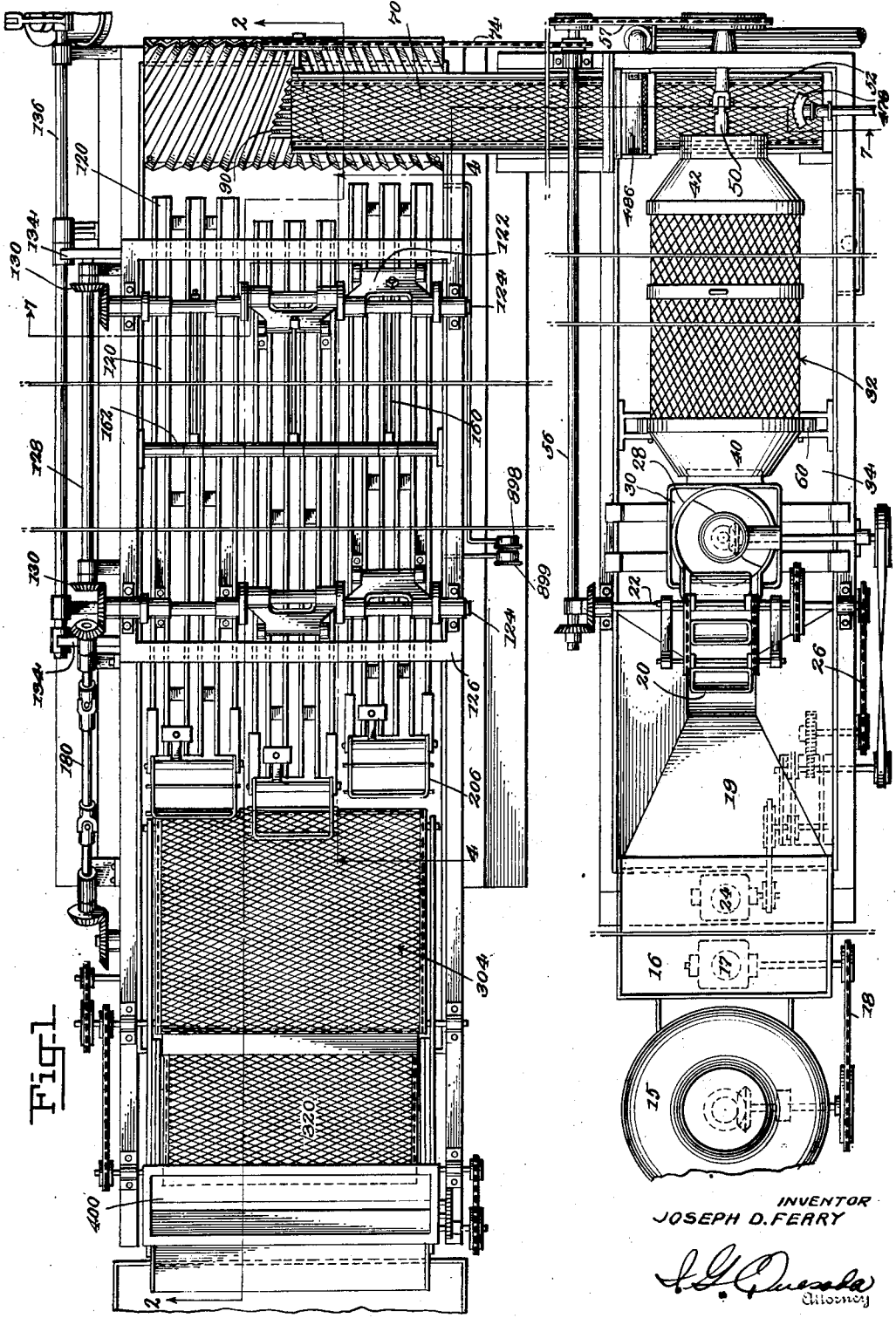

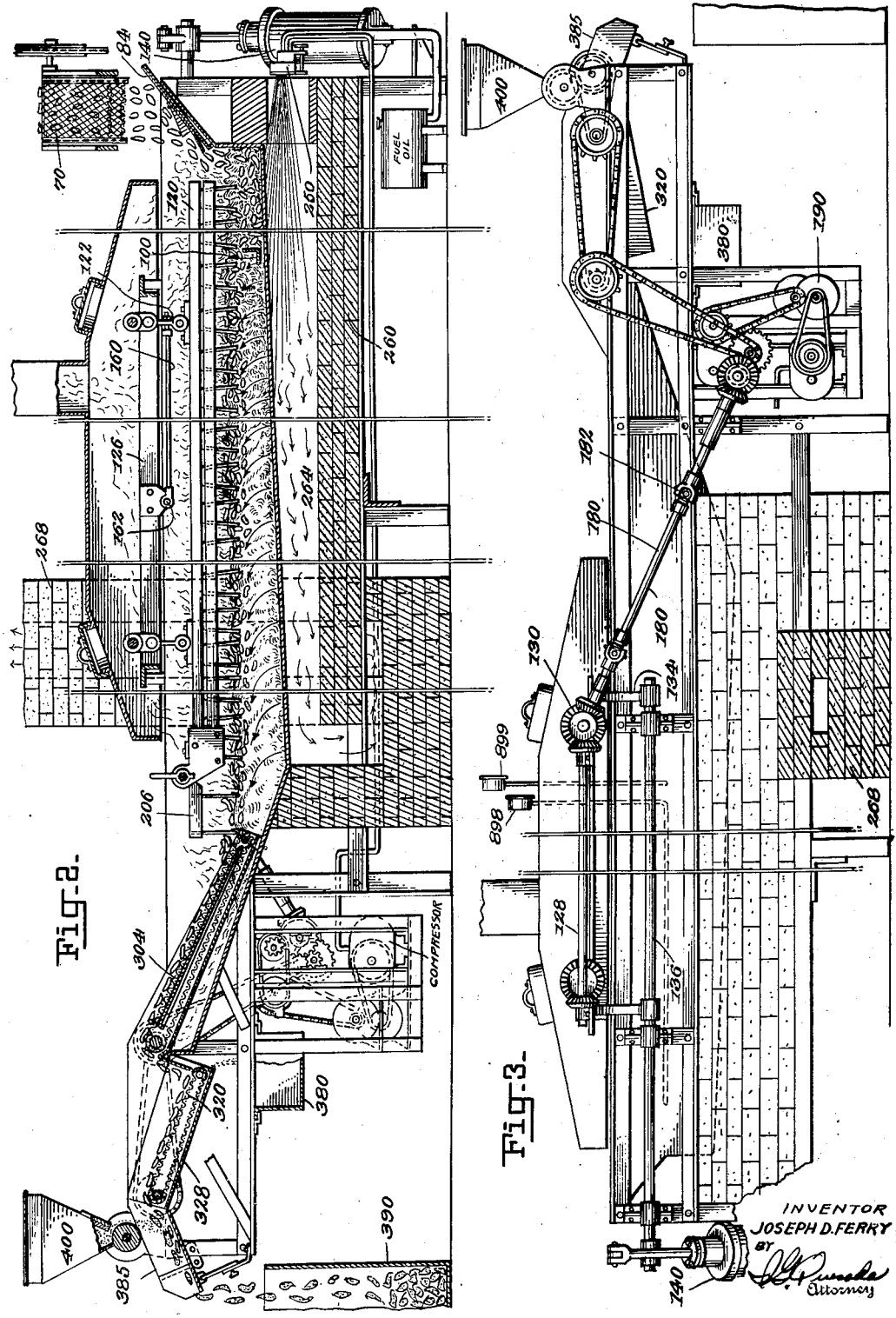

Patented Oct. 6, 1936

2,056,845

UNITED STATES PATENT OFFICE 2,056,845

FOOD HANDLING AND PREPARING APPARATUS

Joseph D. Ferry, Harrisburg, Pa.

Application April 27, 1934, Serial No. 722,779

37 Claims. (Cl. 53—7)

This invention relates to food preparing and cooking equipment and while disclosed for use in manufacturing potato chips, it is clear that the same is adaptable to the preparation of other food stuffs, such for example, as crullers.

By way of brief preliminary reference to the cooking unit, it is pointed out that adjacent the inlet end thereof, and below the level of the cooking liquid, the cooking unit is formed with a baffle preventing the premature advance of the chips along the bottom of the tank so that such chips are not allowed to progress materially in the tank until they have become light enough by frying to rise above the level of the baffle, and in passing it might be explained that frequently potatoes are obtained from different sources requiring different periods for the frying of the chips.

Another major advance marked by the invention will be found to reside in the manner of application of heat to the chip containing kettle and by way of brief explanation of this important feature of the invention it might be said that the source of heat is located adjacent the inlet end of the kettle with the products of combustion directed definitely in the general direction of intended travel of the chips to urge the chips toward the outlet of the kettle.

In further adverting to the manner of application of heat to the kettle and the contents thereof, it is pointed out that there is provided means by which there is maintained a definitely variable temperature differential as between the cooking fluid at the inlet end portion of the kettle on one hand, and the outlet end portion of the kettle on the other, so that the temperatures at different places in the same body of cooking fluid may be regulated to best suit the needs of the goods being handled.

Another feature of the invention has to do with the mechanical impellers by which the chips are subjected to a regulated feed through the cooking solution and by which the chips are prevented from rising out of the solution under the expansive force of steam generated within the chips due, of course, to water initially in the chips.

The invention further provides a novel puddling mechanism located at the point of transfer of the newly fried chips to a discharge conveyor and it will be found that such puddling mechanism is automatically operated and may, if desired, be swung to an out-of-the-way position allowing the operator to puddle by hand provided, of course, the occasion requires.

The invention also looks to the provision of means by which the heat of the newly fried chips is maintained for a sufficient period after the discharge of the chips from the cooking solution to allow of the drainage of excess oil from the chips and in this connection it might be added that the invention contemplates the reversal or turning over of the chips a short distance beyond the point where they leave the cooking solution so as to bring about the drainage of oil from the pockets which are invariably found in potato chips.

Other objects and advantages will be apparent during the course of the following description.

In the accompanying drawings forming a part of this application and in which like numerals are employed to designate like parts throughout the same, Figure 1 is a fragmentary plan view of the improved food preparing and cooking apparatus, Figure 2 is a longitudinal sectional view taken on line 2—2 of Figure 1, Figure 3 is a fragmentary side elevation of the machine, the view illustrating the frying unit and associated parts, Figure 4 is a detail sectional view taken on line 4—4 of Figure 1, Figure 5 is a detail longitudinal sectional view illustrating the outlet end of the frying unit and the associated chip conducting means, Figure 6 is a detail transverse sectional view taken on line 6—6 of Figure 4, Figure 7 is a detail sectional view taken on line 7—7 of Figure 1, Figure 8 is a detail sectional view taken on line 8—8 of Figure 7, Figure 9 is a detail transverse sectional view through the frying unit and illustrating the inlet end portion thereof.

In the drawings, the numeral 15 designates a peeler of conventional or other design and, as shown in Figure 1, the peeler is in feeding relation to a trough 16. For the purpose of convenience the trough 16 is approximately waist-high and is fully open at the top to allow visual inspection of the potatoes. Such bad and spotty potatoes as are observed during the passage of the main supply of potatoes through the trough, may of course, be removed.

A source of power 17 is connected to the peeler 15 by a suitable drive 18. The trough 16 is in feeding relation to a bin 19, the walls of the bin converging toward a well into which the buckets 20 of a conveyor dip. Clearly, the buckets 20 of the conveyor pass successively through the well of the bin 19 and pick up predetermined quantities of potatoes.

Figure 1 also discloses that the bucket conveyor has connection with a motion transmitting cross shaft 22 and that the shaft, in turn, has connection with a source of power 24 through the intervention of a motion transmitting mechanism 26. A speed change mechanism may, if desired, be incorporated in the line of motion between the source of power 24 and the motion transmitting mechanism 26, this being suggested in dotted lines in Figure 1.

The potatoes picked up by the conveyor or elevator embodying the buckets 20 are furnished to a slicer 28 and it is by this slicer that the potatoes are cut into slices of uniform thickness throughout, so that the subsequent frying of the potato slices will produce chips of uniform color, crispness, etc.

The slicer 28 is in feeding relation to an elbow or inlet basket 30 of a rotatable drum generally designated by the numeral 32.

A substantial portion of the basket or inlet elbow 30 is submerged in the liquid within a tank 34 within which the drum is also located, so that the slices upon leaving the slicer and entering the basket 30 are introduced into a body of liquid employed in treating the newly cut potato slices.

The inlet and outlet portions 40 and 42, respectively, of the drum have centrally located openings surrounded by imperforate walls.

To facilitate the periodic removal of starch and small chips from the tank and the thorough cleaning of the tank, the shaft 50 extending lengthwise through the drum and having driving connection therewith, is provided with a pivotal connection 52 by which the drum may be swung into or out of the tank. One end of the shaft 50 is connected with a drive shaft 56 through the intervention of a motion transmitting mechanism 57.

By reference to Figure 1 is will be seen that the drive shaft 56 has connection with the cross shaft 22 of the elevating mechanism. However, it is obvious that the shaft 50 and the associated drum may be driven from any suitable source of power alone or in concert with other parts of the equipment.

The outlet end 42 of the drum 32 is immediately above and in feeding relation to the lower end of an endless conveyor 70, this conveyor being in the nature of an endless reticulated, flexible movable body, preferably of woven wire metal, affording generous interstices for the passage of the fluid as suggested by the arrow in Figure 7. The lower or receiving end portion of the conveyor 70 extends below the level of the fluid in the tank 34 so that the force of such fluid is caused to deposit the newly washed slices upon the upper or ascending flight of the conveyor. This brings about the removal of the slices from the tank.

Since the slices leave the drum under the influence of the circulating fluid and are held more or less separate thereby, such slices are deposited upon the conveyor in like fashion.

As shown in Figure 1 the endless conveyor 70 ascends from a point below the outlet end of the drum to a point above and in feeding relation to the cooking or frying unit for the chips.

The endless conveyor 70 is connected with the previously mentioned drive shaft 56 through a motion transmitting mechanism 74, of any suitable type.

By reference to Figure 7 it will be seen that between the upper and lower flights of the flexible conveyor 70 there is positioned a flat supporting plate 78 of metal, having a generous number of perforations for the passage of the fluid drained from the slices. In addition, that portion of the plate 78 located below the level of the fluid in the tank is perforated so that water or other fluid is caused to deposit the slices on the upper flight of the conveyor and hold such slices in place on the conveyor until the ascent of the slices above the level of the fluid.

From Figures 1 and 7 it will be seen that the tank is provided with a lateral branch underlying a substantial portion of the discharge conveyor 70 to receive drainage therefrom.

It has been found that a portion of the starch extracted from the potato slices accumulates along with other matter, at the outlet end portion of the tank 34. Such accumulation is in the form of a rather light foam on and immediately beneath the surface of the liquid in the tank. As shown in Figure 7, the surface starch is directed, by the spray from a spray head 478, across the tank in the general direction of the drain member 480. The drain member 480 extends above the conveyor 70 in spaced relation thereto and is provided with a longitudinal slot for the drainage of the surface starch. Clearly, the member 480 may be rotated sufficiently to vary the height of the starch receiving slot therein to provide for different liquid levels.

The outlet member 480 is shown in Figure 7 to be associated with a substantially U-shaped hood or deflector 486 having a horizontal top, a vertical back and a downwardly inclined bottom portion all of which are spaced about the member 486 to cooperate therewith in the formation of a passage for the adjacent foamy starch.

The spray head 478 is positioned to direct a spray between the outlet member 480 and the top of the deflector 486 carrying the foam around the back of the member 480 and into the tank liquid immediately below from where the foamy starch enters the member 480. Of course, a small portion of the foamy starch may enter the member 480 without first travelling around the back of the same, although it has been found that by directing the spray from the spray head 478 above and around in back of the member 480, the surface starch and the starch immediately below the surface is picked up in a highly efficient manner.

It is further illustrated in Figure 7 that at a point in back of the deflector 486 and in spaced parallel relation thereto there is a baffle 490 extending from a point above the level of the tank to a point slightly above the ascending chips on the conveyor 70. The function of the baffle 490 is to cooperate with the back portion of the deflector 486 in defining a passage for the ascent of such foamy starch as may pass beyond the deflector 486. Such foamy starch as enters the space between the baffle 490 and the deflector 486 is directed upward and forward over the forward side of the deflector where it is picked up by the spray from the spray head 478 and is eventually conducted into the outlet member 480 along with that part of the surface starch picked up by the deflector 486.

As illustrated in detail in Figure 8, the inlet end portion of the frying unit or vat 80 is inclined in the direction of the bottom of the kettle and has mounted thereon a spacing plate 83, the lower portion of which is flanged inward and is engaged with the said inclined portion of the kettle so as to define an air space between the members 82 and 83. As will appear, the heat at the inlet end portion of the kettle is intense, more so than at other points within the kettle, and it has been found that by spacing the plate 83 from the inlet end of the kettle, the resulting air space prevents the over-heating of the plate 83 and the receiving plate 84, the receiving plate being secured upon the plate 83 in any suitable manner.

The receiving plate 84 is preferably in the nature of a rather thin sheet of metal, possibly Alleghany steel, and has the lower portion thereof extended outward from the spacing plate 83 so as to cooperate therewith in the formation of an intervening air space. This air space between the plates 83 and 84 prevents the heat of the plate 84 from rising to a point where the entering potato slices would be likely to adhere to the plate 84.

That is to say, were the receiving plate 84 allowed to become extremely hot under the influence of the heating means, the entering potato slices would be likely to adhere thereto and it has been found that the provision of the air spaces between the parts 82 and 83 on one hand and the plates 83 and 84 on the other hand maintain the temperature of the plate 84 at a point where the potato slices are allowed to enter the cooking kettle smoothly and evenly.

It is illustrated in Figure 9 that the receiving plate 84 extends entirely across the receiving end of the cooking vat or unit and that such plate carries a spreading device 90 in the form of an inverted V, pivoted at the upper or outer end thereof to the plate as indicated at 92. It is further illustrated in Figure 9 that the spreader or more particularly the sides thereof are joined by a strip 94, having a slot receiving a bolt upon which there is a wing nut 96 or other fastening device by which the spreader is held in an adjusted position for the proper supply of chips to the cooking fluid. That is to say, the spreader may be adjusted about the axis of the pivot element 92, so as to properly direct the chips into the kettle.

By reference to Figure 1 it will be seen that the spreader 90 extends only beneath a portion of the discharge end of the conveyor 70 allowing some of the chips to enter the vat without first striking the spreader. In this manner, there is a uniform distribution of the chips in the feeding end of the vat.

By reference to Figure 9 it will be seen that the inclined receiving plate is corrugated with the corrugations radiating from a common line more or less centrally of the spreader 90 so as to prevent the entering potato slices from sticking to the plate. Likewise the spreader 90 is shown to be corrugated.

When the slices enter the kettle, the same settle to the bottom of the kettle, and by reference to Figure 2 it will be seen that an L-shaped baffle or guard 100 extends entirely across the kettle at a point slightly removed from the inlet end thereof so as to prevent the uncooked potato slices from creeping along the bottom of the tank. In other words, the baffle 100 serves to arrest the advance of the slices until they have become light enough to rise above the baffle, such lightness being imparted to the slices as an incident to the cooking operation.

If desired, there may be several baffle plates corresponding to the baffle plate 100, and such arrangement will be found to be especially advantageous when working with potatoes from different sources, some requiring a longer time than others for frying. That is to say, it requires some slices longer than others to lighten under the initial cooking to a point where the same will rise to the surface of the cooking fluid and when the slices do rise to the surface, the further cooking period is about the same for all potatoes. The baffle thus cooperates with the inlet end of the kettle in the formation of a chamber for the initial cooking of the chips.

The baffle 100 is spaced slightly above the bottom of the kettle to define an intervening space or passage for the movement of the very fine sediment which forms on the bottom of the kettle and creeps along the same toward one end thereof. Were the baffle in engagement with the bottom of the kettle, there would be caused a congestion of this sediment.

The travel of the potato chips through the cooking solution is brought about, in part, by the action of a plurality of spaced, parallel, rake-like, longitudinally extending impellers 120 having depending tines adapted to extend slight distances into the cooking solution and engage the potato chips therein. Of course, the motion of the tines through the cooking solution is one-way and on the return stroke of the tines, the same travel slightly above the level of the cooking solution and the chips therein. By this arrangement, a strictly one-way motion of potato chips through the cooking solution is achieved. The provision of the impellers 120 and the tines thereof avoids clustering of the chips and at the same time inhibits the rise of the chips above the level of the fluid under the influence of steam generated within the chips.

In explaining this, it is pointed out that in some potato chips, water remains therein and upon being heated this water generates steam by which the potato chips tend to rise. The overhanging impellers and the close arrangement of the depending tines avoids the flight of the ascending potato chips substantial distances above the surface of the cooking solution.

More specifically, the bodies of the impellers 120 are in the nature of spaced, parallel, elongated headers or members having broad lower surfaces in opposed relation to the surface of the cooking fluid and overhanging the major portion of the surface of the fluid between the inlet and outlet ends of the kettle so as to form, in effect, baffles. The uniform distribution of these baffles and the spread of the tines over the surface of the cooking fluid, as shown in Figure 7, resist the rise of the chips substantial distances above the surface at points between the ends of the impellers.

From Figure 1 it will be seen that the impellers 120 are arranged in laterally spaced groups of three each, and by reference to Figures 2 and 7 it will be seen that the groups of impellers are suspended from links 122 which, in turn, are suspended from a pair of spaced parallel transversely extending crank shafts 124.

Figure 1 illustrates that the two crank shafts 124 are rotatably mounted upon what might be said to be an impeller frame 126, and that the crank shafts are caused to operate in unison by a longitudinally extending shaft 128 connected at the ends thereof to the crank shafts by co-acting beveled gears 130.

The rake frame 126 is shown in Figures 1 and 3 to be provided with a pair of laterally projecting arms or brackets 134 keyed or otherwise secured upon a longitudinally extending rock shaft 136. By reference to Figure 7, it will be seen that one end portion of the rock shaft 136 has connection with a hydraulic fluid lift 140 or other suitable source of power to provide for the turning of the shaft 136 and for the corresponding movement of the rake frame 126 and associated parts. That is to say, by the actuation of the hydraulic fluid lift 140 or its mechanical equivalent, the rake frame 126 and parts carried thereby may be swung into or out of the kettle so as to provide for the expeditious cleaning of the kettle. In addition, the hydraulic fluid lift forms a means by which the frame 126 and parts carried thereby may be held in an elevated position out of the kettle.

Referring now to Figures 1 and 2, it is pointed out that the elliptical motion of the impellers 120 is brought about by links 160 secured to the intermediate portions of the connecting rods 122 and to a cross arm or bar 162, the said cross arm or bar 162 being secured to the intermediate portion of the frame 126. It is believed to be clear that the employment of the links 160 provides a simple means by which a definitely predetermined elliptical movement is imparted to the impellers to bring about the desired advance of the potato chips through the cooking solution.

As illustrated particularly in Figure 4 the tines of the impellers 120 on each down-stroke thereof engage, immerse, and slightly advance the chips. It is also illustrated in this figure that the major axis of the elliptical path of the impellers is substantially vertically arranged so that the duration of the period of immersion and the advancement of the chips through the cooking liquid upon each stroke of the impellers is determined or controlled by the length of the minor axis of the elliptical path. As might be otherwise stated, the minor axis of the elliptical path of the impellers is arranged substantially parallel to the direction of movement of the chips through the machine so that the duration of immersion and advancement of the chips toward the outlet end of the kettle upon each stroke of the impellers is governed by the length of the minor axis of the elliptical path. By reason of this motion, the chips are advanced only a slight distance on each stroke of the impellers, so that the travel of the chips through the cooking liquid is relatively slow, insuring proper cooking or frying of the chips by the time the same reach the outlet end of the kettle. Also, the duration of each period of immersion of the chips is relatively short so that the chips are prevented from becoming oil soaked.

Attention is now invited to Figure 3, in which it is illustrated that one of the gears 130 of the impeller mechanism is geared to a complemental gear on the upper portion of a motion transmitting shaft 180. The shaft 180 is rotatably mounted in suitable bearings carried by the frame of the equipment and is provided at appropriately spaced points with universal joints 182 affording a means by which the impellers may be swung into and out of the kettle. The lower portion of the shaft 180 is shown to be connected to a suitable source of power 190 through the intervention of motion transmitting and speed change means of any preferred type.

Figures 1, 4 and 6 illustrate a puddling mechanism embodied in the invention and providing a means by which the potato chips are subjected to a final submersion and puddling in the cooking oil. In explaining the puddling mechanism, it is pointed out that the several groups of impellers or more particularly the outside headers or bars of each group of impellers are provided with brackets 200 pivotally supporting U-shaped bodies 206 from which there depends pairs of impeller blades 210.

The blades 210, as shown in Figure 6, are more or less flat and broaden in the direction of the lower ends thereof for effective contact with the chips. The several U-shaped bodies 206 of the puddling mechanism may be swung about horizontal axes and may be secured in the operative horizontal positions disclosed by full lines in Figure 4, or in the inoperative positions suggested by dotted lines in that same figure.

Handles 214 have connection with the pivotal mountings of the bodies 206 and provide a simple means by which such blades may be swung from operative to inoperative positions and vice versa as suggested in Figure 4 by full and dotted lines and arrows.

There are occasions such, for example, as when the machine is started off when it may be desired to puddle by hand, in which case, the puddling mechanism is thrown to the dotted line position suggested in Figure 4.

As described, the impellers 120 play a part in the travel of the chips through the kettle and acting in cooperation with such tines in the performance of this function, there will be found the heat which is furnished to the kettle.

It is illustrated in Figure 2 that a burner 250 for oil or gas mixed with air, of course, is located beneath the kettle at the inlet end thereof and thus imparts to the cooking oil at the inlet end portion of the kettle, a temperature higher than that prevailing at the opposite end or outlet end of the kettle. More particularly, the heat from the burners 250 strikes the kettle bottom and passes along the underside of the kettle for the full length thereof, being directed through the passage 264 between the kettle and the fire brick 260.

At the outlet end of the kettle, the passage or flue for the heat descends and then turns laterally into a chimney 268. The passage 264 beneath the kettle extends for the full width of the kettle while the burners 250 are sufficient in number and power to heat the cooking oil entirely across the kettle for the full length thereof.

The difference in temperature of the cooking fluid at the inlet and outlet portions of the kettle is regulated by the pressure of the air mixed with the oil or gas, as the case may be. That is to say, by increasing the air pressure, the temperature is raised in the outlet end portion of the kettle as compared to the temperature in the inlet end portion. On the other hand, by decreasing the air pressure the temperature of the cooking oil at the outlet end portion of the kettle is lowered. In this way the temperature differential in the inlet and outlet end portions of the kettle is regulated to suit the particular potatoes being handled and to bring about chips of the best quality while at the same time, this arrangement provides for maximum production.

By reference to Figure 1, it will be seen that the inlet and intermediate portions of the kettle have connection with temperature gauges 898 and 899, respectively, and that such gauges provide a means for determining the relative temperatures of the fluid at spaced points within the kettle, from which the operator is guided in regulating the supply of oil and air.

The endwise direction of the heat from the burners has been found to urge the chips toward the outlet of the kettle and at the same time such heating of the solution turbulates the oil and avoids pockets or regions of low temperature so that in addition to heating the fluid, the burners or the heat therefrom imparts a definite endwise movement to such fluid by which there is aided the movement of the chips through the kettle.

Upon being conducted through the kettle, the potato chips are picked up by the submerged lower portion of the discharge conveyor 304. The body of the conveyor is preferably in the nature of a reticulated woven wire belt, endless, of course, and extending from a point well below the surface of the cooking solution to a point substantially above such level to conduct the potato chips to the desired point.

It is clearly illustrated in Figure 5 that a drain plate 305 is located above and in spaced relation to the sloping bottom wall 306 at the outlet end portion of the kettle, so as to cooperate therewith in the formation of an intervening chamber for the reception of a portion of the heat rising from the cooking solution. That is to say, the walls 305 and 306 extend from points below the level of the cooking fluid to points substantially above such level and therefore define a passage for the rise of a portion of the heat from the cooking fluid.

Now, in Figure 5 it is further illustrated that the drain plate 305 is formed with perforations 308, allowing the heat rising from a portion of the cooking solution to come in contact with the form plate 310 to assist in maintaining the temperature of the potato chips upon leaving the cooking solution.

The plate 310 is shown in Figure 5 to be located between the upper and lower flights of the conveyor 304 and in fact, is shown to extend from a point below the level of the cooking solution to a point substantially above such level to cooperate with the drain plate 305 in the formation of an open-ended intervening chamber for the passage of heat from the cooking solution. The heat which rises from the space between the plates 304 and 305 on one hand, and the heat which rises between the plates 305 and 306 on the other, is of material assistance in maintaining the heat of the potato chips ascending on the upper flight of the conveyor and by reason of this, the rapid cooling of the grease on the chips is avoided.

By thus continuing the heat treatment of the chips for a period after the chips leave the cooking solution, opportunity is afforded for the drainage of oil from the chips during the ascent of the chips on the conveyor 304 and during the reversal of the chips as suggested in Figure 5.

Also, it will be seen that the heat thus furnished the chips after the chips leave the cooking solution and while the chips are ascending the discharge conveyor 304, produces a toasting effect by which the flavor of the chips is appreciably improved. It has been found that by maintaining the heat of the chips for a short period immediately after leaving the frying solution first to allow of the effective drainage of oil therefrom and second, to bring about a final toasting effect, the desirability and the salability of the chips is materially enhanced.

The elevated discharge end of the conveyor 304 is located in feeding relation to a second conveyor 320 and between these two conveyors there is an inclined apron 322. It is important to observe that the chips, upon being discharged from the raised end of the conveyor 304 are allowed to turn over or reverse while being transferred from the conveyor 304 to the conveyor 320 and it is by reason of such reversal of the chips that the oil previously collected in pockets in some of the chips is drained. That is to say, the cooking of the chips curls the chips and produces occasional pockets therein, in which oil invariably collects, and it has been found that by reversing the chips after the fashion shown in Figure 5, the oil which may have been collected by such chips is allowed to drain, especially since the heat treatment of the chips is continued after the chips leave the cooking solution.

The discharge conveyor 304 is shown to be horizontally pivoted at the upper portion thereof to allow the conveyor to be swung upward for cleaning or other purposes. In this connection, it is observed that the upper portion of the drain plate 305 is directed downward to form the apron 322 and since the plate 305 forms a part of and is pivotally mounted along with conveyor 304, the elevation of the conveyor 304 will swing the apron in a counter-clockwise direction as viewed in Figure 5, so as to permit the conveyor 320 to be swung upward to elevated position for cleaning or other purposes.

The conveyor 320 is shown in Figure 2 to be mounted within a sort of frame or trough 328, the trough being inclined downward toward the receiving end of the conveyor and having the lower end open for the drainage of oil which drops from the chips. Below the open lower end of the trough or frame 328 there is a receiver 380 for the collection of the oil which drains from the chips. In addition to serving to conduct the chips to a point of discharge, the conveyor 320 provides a place for the chips to cool before being packaged.

In carrying out the invention, the trough may have an adjustable outlet end portion 385, open at the lower end thereof of the discharge of the chips into a suitable receiver 390.

It is further illustrated in Figure 2 that while the chips are passing through the trough the same may be salted through the action of a salting mechanism 400, thereby completing the manufacture of the chips.

Having thus described the invention what is claimed is:

1. In a cooking unit, a kettle for the reception of food stuffs and a cooking liquid and having inlet and outlet ends for food stuffs, means to advance of food stuffs through the kettle in the direction of the outlet end thereof, and a baffle traversing the kettle at a point adjacent to and in spaced relation to said inlet end, necessitating the rise of the food stuffs above the baffle to advance beyond the same, said baffle having an upper edge located below the liquid level in the kettle.

2. In a cooking unit, a kettle for the reception of food stuffs and a cooking liquid and having inlet and outlet ends for food stuffs, means to advance the food stuffs through the kettle in the direction of the outlet end thereof, and a baffle traversing the kettle at a point adjacent to and in spaced relation to said inlet end, necessitating the rise of the food stuffs above the baffle to advance beyond the same, said baffle being spaced slightly above the bottom of the kettle to form an intervening passage for the sediment to relieve the chamber of the congestion of sediment.

3. In a cooking unit, a kettle for the reception of food stuffs and a cooking liquid and having inlet and outlet ends for food stuffs, means to advance the food stuffs through the kettle in the direction of the outlet end thereof, and a baffle traversing the kettle at a point adjacent to and in spaced relation to said inlet end, thereby cooperating therewith in the formation of a chamber for the initial cooking of the food stuffs, said baffle being disposed below the level of the cooking liquid in the kettle necessitating the rise of the food stuffs above the baffle to advance beyond the baffle.

4. In a cooking unit for food stuffs, a kettle for the reception of food stuffs and a cooking liquid and having inlet and outlet ends, and a heating device located adjacent the inlet end of the kettle and having means to project the products of combustion in the direction of the outlet end of the kettle, said means embodying an air supply of a definitely variable adjustable pressure to vary the range of the heat from said burners and thereby vary the relative temperatures at opposite ends of the kettle, and a baffle traversing the kettle at a point below the fluid level therein and at a point adjacent the said inlet end of the kettle to cooperate with such inlet end of the kettle in the formation of a chamber for the initial cooking of the food stuff.

5. In a cooking unit, a kettle for the reception of food stuffs and a cooking liquid and having inlet and outlet ends for food stuffs, said inlet end of the kettle having an inclined portion, a receiving plate mounted on said inclined portion and having a lower edge portion projecting beyond the inclined portion and spaced above the same to form an intervening air chamber.

6. In a cooking unit, a kettle for the reception of food stuffs and a cooking liquid and having inlet and outlet portions for food stuffs, said inlet portion of the kettle having a bottom wall, a receiving plate mounted on said bottom wall and having a lower edge portion projecting beyond the said bottom wall and spaced slightly above the same to form an intervening air chamber, and a heater for the contents of the kettle and positioned adjacent to the inlet portion of the kettle and having a heat projecting range extending beneath the inlet portion.

7. In a cooking unit, a kettle for the reception of food stuff and a cooking liquid and having an inlet portion for food stuffs, a receiving plate mounted on said inlet portion and having a lower edge portion spaced above the same to form an intervening air chamber, a heater for the contents of the kettle and located adjacent to the said inlet end of the kettle, and a spreading device adjustably mounted upon said receiving plate.

8. In a food cooker, a container for the reception of a cooking liquid and food and having a bottom wall, a heater for the contents of the container, a food conducting conveyor rising from a point below the level of the liquid in the container to a point above such level and having a plate immediately adjacent to and in spaced approximately parallel relation to the said bottom wall of the container and cooperating therewith in defining a heat conducting chamber underlying the conveyor to furnish heat to the food being conducted by the conveyor.

9. In a food cooker, a container for the reception of a cooking liquid and food and having a sloping wall at one end portion thereof, a heater for the contents of the container, a conveyor rising from a point below the level of the liquid in the container to a point above said level and having upper and lower flights and a plate in supporting relation to the upper flight, said supporting plate being in opposed spaced relation to said sloping wall of the container and cooperating therewith in the formation of a heating chamber, said plate having a lower end disposed below the liquid level in the container and having an upper end above the liquid level, said sloping wall and said plate being spaced from each other at the ends thereof defining inlet and outlet openings for heat.

10. In a food cooking mechanism, a container for the reception of a cooking liquid and food and having a sloping wall at one end portion thereof, a heater for the contents of the conveyor, a sloping discharge conveyor rising from a point below the level of the liquid in the container and having upper and lower flights and a plate in supporting relation to the upper flight, said supporting plate being in opposed spaced relation to said sloping wall of the container and cooperating therewith in the formation of a heating chamber, said plate having a lower end disposed below the liquid level in the container and having an upper end above the liquid level, said sloping wall and said plate being spaced from each other at the ends thereof defining inlet and outlet openings for heat, and means supporting the discharge conveyor and the plate thereof for movement about a horizontal axis.

11. In a food preparing mechanism, a container for the reception of a cooking liquid and food and having an outlet portion provided with a sloping portion rising from a point below the liquid level in the container to a point above the liquid level, a heater for the contents of the container, a food discharge conveyor extending into said outlet portion of the container to a point below the level of liquid in the container and rising to a point above the liquid level, said conveyor having a movable reticulated conveyor element of flexible material provided with upper and lower flights, the conveyor also being provided with an imperforate plate underlying the upper flight of the conveyor in supporting relation thereto and extending from a point below to a point above the liquid level in opposed spaced relation to said sloping portion of the container to cooperate therewith in the formation of a heating chamber underlying a substantial portion of the upper flight of the conveyor and extending upward from the cooking liquid to receive heat from the cooking liquid.

12. In a machine for the manufacture of potato chips, a kettle for the reception of potato slices and a cooking liquid, a conveyor extending from the cooking liquid and having potato slices conducting means, said conveyor being provided with receiving and discharge ends, and a second conveyor associated with the first named conveyor and having a receiving portion located substantially below the discharge end portion of the first named conveyor to allow the potato slices to reverse while dropping from the first to the second named conveyors.

13. In a machine for the manufacture of potato chips, a kettle for the reception of potato slices and a cooking liquid, a conveyor extending from the cooking liquid and having potato slice conducting means, said conveyor being provided with receiving and discharge ends, a receiving means located substantially below the discharge end portion of the first named conveyor to allow the potato slices to reverse while being dropped from the conveyor to the receiving means, and a drain member underlying the receiving means for the collection of the drainage from the potato slices.

14. In a machine of the character specified, a container adapted for the reception of a cooking solution, a frame above the container, a pair of crank shafts mounted on the frame, means connecting the crank shafts for movement in unison, impellers beneath the crank shafts, connecting rods joining the impellers to the crank shafts, links pivoted to the connecting rods and the frame for causing movement of the impellers in elliptical paths, and means supporting the frame and the aforesaid parts carried thereby for movement together from operative to inoperative positions and vice versa about a substantially horizontal axis extending longitudinally of the container.

15. In a potato chip machine, a container adapted for the reception of a cooking liquid, a frame above the container and having a motion transmitting mechanism, separately movable impellers suspended from said motion transmitting mechanism and provided with tines and means causing the movement of said impellers in an elliptical path to cause the tines thereof to dip into the cooking liquid when traveling in one direction and to return at a level above that of the cooking liquid when traveling in the other direction, said impellers having surfaces opposed to the potato chips in said cooking liquid to cooperate with said tines in inhibiting premature removal of the potato chips from the cooking liquid.

16. In a potato chip machine, a container adapted for the reception of a cooking liquid, a frame in superposed relation to said container and having a motion transmitting mechanism, separately movable impellers suspended from said motion transmitting mechanism and provided with tines, and means carried by the frame for causing the movement of said impellers in an elliptical path to cause the tines to dip into the cooking liquid when traveling in one direction and to return on an elevated level when traveling in the other direction, said impellers being provided with surfaces in opposed relation to the surface of the cooking liquid to form baffles resisting the premature rise of the chips above the surface at points between the ends of the impellers.

17. In a food cooking mechanism, a container for the reception of a cooking liquid and food, a heater for the contents of the container, a sloping discharge conveyor rising from a point below the level of liquid in the container to a point above such level and having upper and lower flights and a plate in supporting relation to the upper flight, one wall of said container being in opposed spaced relation to said plate to cooperate therewith in the formation of a chamber underlying the upper flight of the conveyor, said chamber having the lower portion thereof open for the reception of heat from the liquid in the container.

18. In a food cooking mechanism, a container for the reception of a cooking liquid and food, a heater for the contents of the container, a sloping discharge conveyor rising from a point below the level of liquid in the container to a point above such level and having upper and lower flights and a plate in supporting relation to the upper flight, one wall of said container being in opposed spaced relation to said plate to cooperate therewith in the formation of a chamber underlying the upper flight of the conveyor, said chamber having the lower portion thereof open for the reception of heat from liquid in the container, and means supporting the conveyor and said plate thereof for movement about an axis exteriorly of the container.

19. In a food cooking mechanism, a container for the reception of a cooking liquid and food and having inlet and outlet portions, the outlet end portion of the container being formed with a sloping bottom extending to a point above the liquid level, a heater for the contents of the container, a food discharge conveyor contiguous to said sloping bottom and having a reticulated body and a plate in supporting relation thereto and adjacent to and in spaced relation to said sloping bottom, said plate being extended upward from the liquid level and cooperating with said sloping bottom in the formation of a heating chamber underlying a portion of said conveyor to heat the food thereon, said heating chamber being extended upward from the liquid level to receive heat from the liquid.

20. In a food preparing mechanism, a container for the reception of a cooking liquid and food and having an outlet portion provided with a sloping portion rising from a point below the liquid level in the container to a point above the liquid level, a heater for the contents of the container, a food discharge conveyor extending into said outlet portion of the container to a point below the level of liquid in the container and rising to a point above the liquid level, said conveyor having a movable reticulated conveyor element of flexible material provided with upper and lower flights, the conveyor also being provided with an imperforate plate immediately underlying the upper flight of the conveyor element in supporting relation thereto and extending from a point below to a point above the liquid level in opposed spaced relation to said sloping portion to cooperate therewith in the formation of a heating chamber underlying a substantial portion of the upper flight of the conveyor element and extending upward from the level of the cooking liquid to receive heat from the cooking liquid.

21. In a food preparing mechanism, a container for the reception of a cooking liquid and food and having an outlet portion provided with a sloping wall rising from a point below the liquid level in the container to a point above the liquid level, a heater for the contents of the container, a food discharge conveyor extending into said outlet portion of the container to a point below the level of liquid in the container and rising to a point above the liquid level, said conveyor having a movable reticulated conveyor element of flexible material provided with upper and lower flights, the conveyor also being provided with an imperforate plate immediately underlying the upper flight of the conveyor element in supporting relation thereto and extending from a point below to a point above the liquid level in opposed partly spaced relation to said sloping wall to cooperate therewith in the formation of a heating chamber underlying a substantial portion of the upper flight of the conveyor element and extending upward from the level of the cooking liquid to receive heat from the cooking liquid, and means supporting the conveyor and said plate thereof for movement about a substantially horizontal axis.

22. In a potato chip machine of the type in which potato chips are freely suspended in a cooking liquid and are agitated therein, a heater, a container for a cooking liquid and potato chips and in operative relation to said heater whereby heat from the heater may freely agitate the potato chips in the cooking liquid, impellers for intermittent engagement with the agitated chips and movable through the cooking liquid, said impellers having means extending over and covering the major portion of the surface of the cooking liquid to act as baffles limiting upward movement of the chips under the expansive force of steam generated therein, and operating means for the impellers.

23. In a potato chip machine of the type in which potato chips are freely suspended in a cooking liquid and are agitated therein, a heater, a container for a cooking liquid and potato chips and in operative relation to said heater whereby heat from the heater may freely agitate the potato chips in the cooking liquid, impellers for intermittent engagement with the agitated chips and movable through the cooking liquid, said impellers being provided with elongated longitudinally movable headers having lower surfaces extending over a substantial portion of the container to act as baffles limiting upward movement of the chips under the expansive force of steam generated therein, and operating means for the impellers.

24. In a cooking unit, a kettle for the reception of food stuffs and a cooking liquid and having inlet and outlet portions for food stuffs, means to move the food stuffs through the kettle from the inlet to the outlet portions thereof, and a baffle traversing the kettle at a point between the inlet and outlet portions of the kettle necessitating the rise of the food stuffs above the baffle to advance beyond the same.

25. In a cooking unit, a kettle for the reception of food stuffs and a cooking liquid and having inlet and outlet portions for food stuffs, means to move the food stuffs through the kettle from the inlet to the outlet portions thereof, and a baffle traversing the kettle at a point between the inlet and outlet portions of the kettle necessitating the rise of the food stuffs above the baffle to advance beyond the same and having an upper edge below the level of liquid in the kettle.

26. In a cooking unit, a kettle for the reception of food stuffs and a cooking liquid and having inlet and outlet portions for food stuffs, means to move the food stuffs through the kettle from the inlet to the outlet portions thereof, and a baffle traversing the kettle at a point between the inlet and outlet portions of the kettle necessitating the rise of the food stuffs above the baffle to advance beyond the same, said baffle being spaced above the bottom of the kettle to cooperate therewith in the formation of a passage for sediment.

27. In a cooking unit, a kettle for the reception of food stuffs and a cooking liquid and having inlet and outlet portions for food stuffs, means to move the food stuffs through the kettle from the inlet to the outlet portions thereof, and a baffle traversing the kettle at a point between the inlet and outlet portions of the kettle necessitating the rise of the food stuffs above the baffle to advance beyond the same, said kettle being formed with a bottom declining toward said outlet portion to increase the depth of liquid toward the outlet portion of the kettle.

28. In a cooking unit for food stuffs, a kettle for the reception of food stuffs and a cooking liquid and having an inlet portion, a heating device located adjacent to the inlet portion of the kettle and having means to adjustably project the products of combustion to points beyond the inlet portion of the kettle and beneath the same and thereby vary the relative temperatures of the kettle liquid at spaced points within the kettle, and means cooperating with the said inlet portion of the kettle in the formation of a chamber adjacent to said heating device for the initial cooking of the food stuffs.

29. In a cooking unit, a kettle for the reception of food stuffs and a cooking liquid and having an inlet portion for food stuffs, a heater for the contents of the kettle, and a receiving plate for food stuffs above the inlet portion and in slightly spaced relation thereto to cooperate therewith in the formation of a cooling chamber beneath the receiving plate.

30. In a potato chip machine, a container for the reception of a cooking liquid and adapted to have potato chips moved therethrough, an impeller in said container above the level of the liquid therein, said impeller embodying depending members, means for effecting movement of said impeller in an elliptical path to cause said depending members to intermittently dip into the cooking liquid when travelling in one direction for engaging and advancing the chips and to return at a level above that of the cooking liquid when travelling in the other direction, the minor axis of the elliptical path of the impeller being substantially parallel to the direction of movement of the chips through the machine, whereby the advancement of the chips during each stroke of the impeller is determined by the length of said minor axis.

31. In a potato chip machine, a container for the reception of a cooking liquid and adapted to have potato chips moved therethrough, an impeller in said container above the level of the liquid therein, said impeller embodying depending members, means for effecting movement of said impeller in an elliptical path to cause said depending members to intermittently dip into the cooking liquid when travelling in one direction for engaging and advancing the chips and to return at a level above that of the cooking liquid when travelling in the other direction, the major axis of the elliptical path of the impeller being substantially vertically arranged whereby the advancement of the chips during each stroke of the impeller is determined by the length of the minor axis of the elliptical path.

32. In a potato machine, a container for the reception of a cooking liquid and adapted to have potato chips moved therethrough, an impeller in said container above the level of the liquid therein, said impeller embodying depending relatively closely arranged tines, means for effecting movement of said impeller in an elliptical path to cause said tines to intermittently dip into the cooking liquid when travelling in one direction for engaging, immersing and advancing the chips and to return at a level above that of the cooking liquid when travelling in the other direction, the major axis of the elliptical path of the impeller being substantially vertically arranged whereby the duration of the period of immersion and the advancement of the chips upon each stroke of the impeller is determined by the length of the minor axis of the elliptical path.

33. In a potato machine, a container for the reception of a cooking liquid and adapted to have potato chips moved therethrough, an impeller in said container above the level of the liquid therein, said impeller embodying depending relatively closely arranged tines, means for effecting movement of said impeller in an elliptical path to cause said tines to intermittently dip into the cooking liquid when travelling in one direction for engaging, immersing and advancing the chips and to return at a level above that of the cooking liquid when travelling in the other direction, the minor axis of the elliptical path of the impeller being substantially parallel to the direction of movement of the chips through the machine, whereby the duration of the period of immersion and the advancement of the chips upon each stroke of the impeller are controlled by the length of said minor axis.

34. In a potato chip machine, a container for the reception of a cooking liquid and having inlet and outlet ends through which potato chips are adapted to be passed, a frame above the container and having a motion transmitting mechanism, impellers suspended from said motion transmitting mechanism and provided with depending relatively closely arranged tines, and means causing movement of said impellers in an elliptical path to cause the tines thereof to dip into the cooking liquid when travelling in one direction to move the chips in a step-by-step fashion toward the outlet end of said container and to return at a level above that of the cooking liquid when travelling in the other direction, the minor axis of the elliptical path of the impeller being substantially parallel to the direction of movement of the chips through the machine whereby the advancement of the chips during each stroke of the impellers is determined by the length of said minor axis.

35. In a cooking unit, a kettle for the reception of foodstuffs and a cooking liquid and having an inlet portion, and a corrugated receiving plate for foodstuffs mounted upon said inlet portion in slightly spaced relation thereto to define a cooling chamber beneath the receiving plate.

36. In a cooking unit, a kettle for the reception of foodstuffs and a cooking liquid, and having an inlet portion for foodstuffs, a spacing plate mounted upon the inlet portion of the kettle and having its major portion spaced therefrom to cooperate with the inlet portion in defining an intervening cooling chamber, and a corrugated receiving plate for foodstuffs mounted upon said spacing plate.

37. In a cooking unit, a kettle for the reception of foodstuffs and a cooking liquid and having an inlet portion for foodstuffs, a spacing plate mounted upon the inlet portion of the kettle and having its lower edge flanged inwardly and engaged with the inlet portion so that such plate and said inlet portion cooperate to define an intervening air space, and a corrugated receiving plate mounted upon said spacing plate and adapted to be engaged by the foodstuffs introduced into the kettle, said receiving plate having its lower edge spaced above said spacing plate to define a second air space.

JOSEPH D. FERRY.